Feb. 9, 1943.  F. ULRICH  2,310,660
MACHINE AND METHOD FOR MAKING SLIDE FASTENERS
Filed March 28, 1939   2 Sheets-Sheet 1
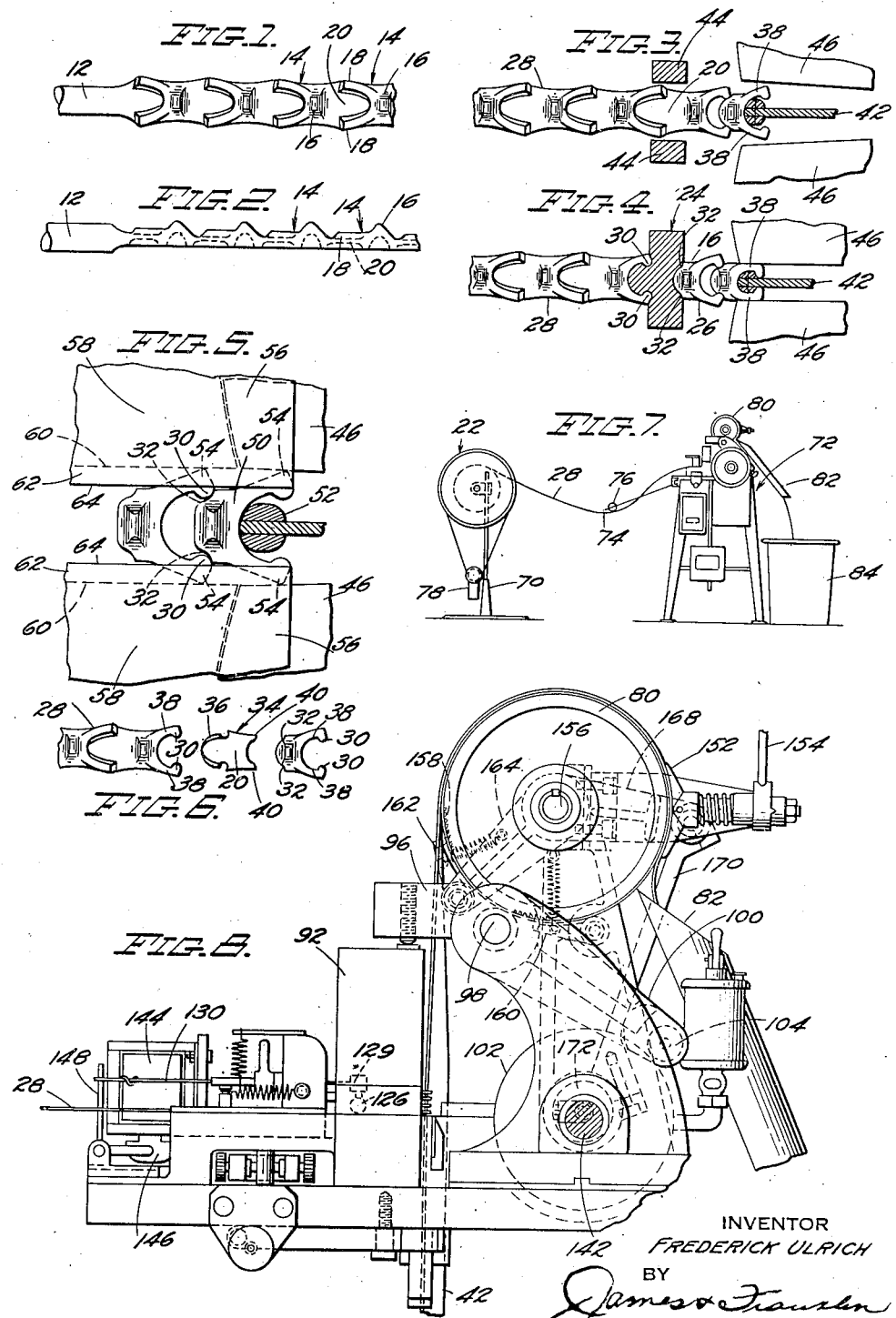
INVENTOR
FREDERICK ULRICH
BY
James & Franklin
ATTORNEY

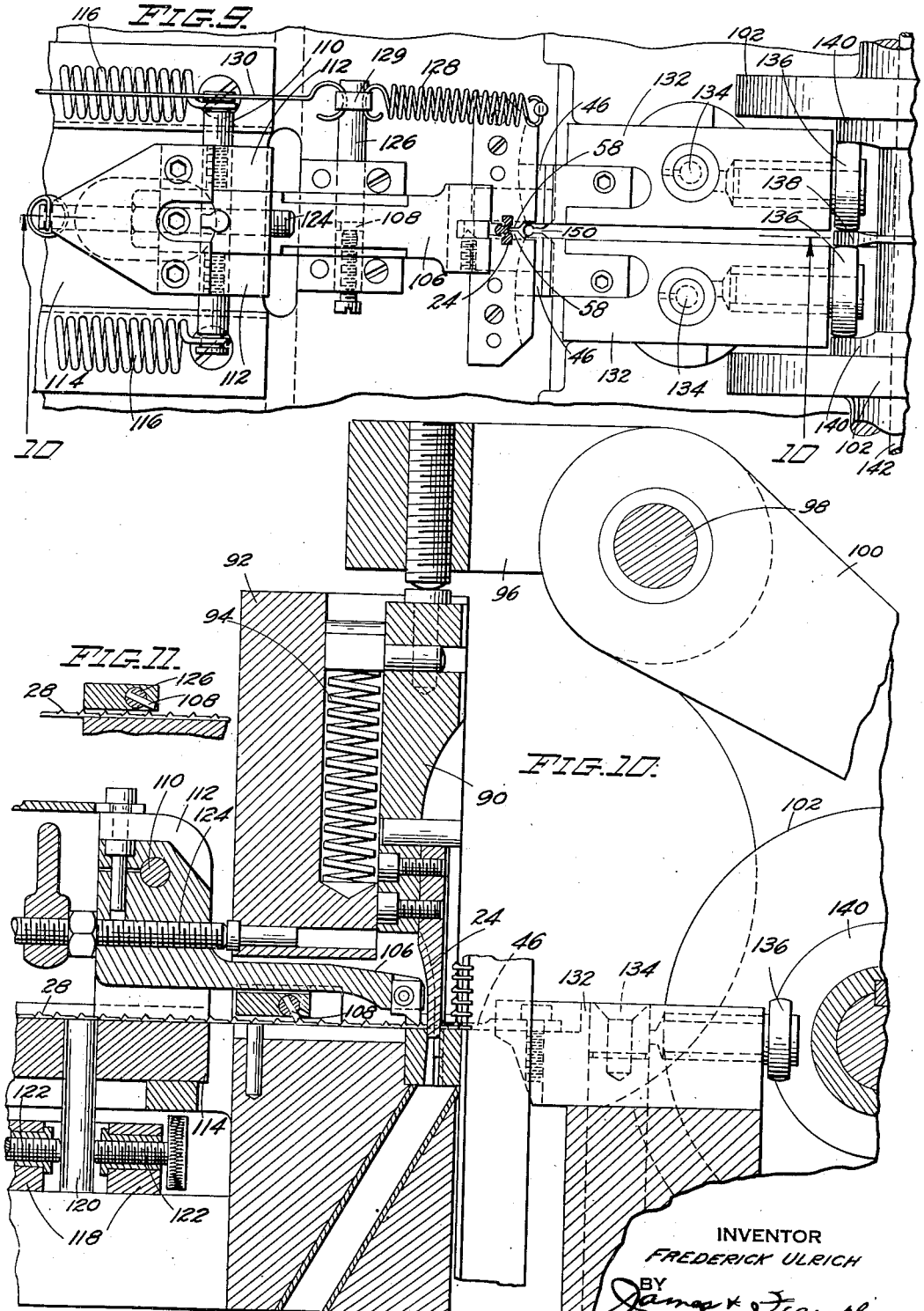

Patented Feb. 9, 1943

2,310,660

UNITED STATES PATENT OFFICE 2,310,660

MACHINE AND METHOD FOR MAKING SLIDE FASTENERS

Frederick Ulrich, Bayonne, N. J., assignor to Conmar Products Corporation, Bayonne, N. J., a corporation of New Jersey Application March 28, 1939, Serial No. 264,552

10 Claims. (Cl. 153—1)

This invention relates to slide fasteners, and more particularly to a method and apparatus for manufacturing the same.

The primary object of my invention is to generally improve the manufacture of slide fasteners. A more particular object is to generally improve the process and apparatus disclosed in a co-pending application of George Wintritz, Serial Number 215,180, filed June 22, 1938, issued as Patent No. 2,201,068 on May 14, 1940. The said application discloses rolling apparatus for pressing and deforming a wire into an integrally connected series of embryo fastener elements, and an attaching machine which severs the elements and attaches the same to a tape. The present invention deals with the attaching apparatus.

In the attaching apparatus as heretofore constructed, the wire is fed toward the tape to bring jaws at the end of the wire astride the tape. The jaws are clamped on the tape, and simultaneously, a punch punches away a piece of scrap metal between the endmost element and the wire, thereby severing the element from the wire. Several difficulties arise. One is a tendency for the severed elements to assume an angular disposition, when looking perpendicularly to the plane of the tape, due to the pressure exerted by the punch at the head of the element. Another difficulty is that any bend or kink in the wire may result in the crooked attachment of an element when that part of the wire reaches the tape. Still another difficulty centers about the structure of the punch and die mechanism, the die being extremely limited in dimension because of the very close and immediate association of the tape therewith.

Further objects of my invention are to overcome the foregoing difficulties, and to this end I move the punch a short distance away from the tape, thereby cutting away the scrap between elements at a point slightly removed from the tape. One or more severed or loose elements may be disposed between the punch and the tape in order to fill in the space therebetween. These severed elements are confined within appropriate guides during their movement to the tape.

This construction permits of a more substantial die structure and eliminates angular attachment of the elements. However, I have found that because of the shape of the elements while the jaws are still open, the elements may tend to turn to biased position while in the track or guide leading to the tape. Moreover, a similar tendency may arise when the jaws are clamped against the tape, as for example, if one jaw is stronger than the other. There thus arises a possibility of angular disposition of the elements, as viewed from one end of the tape.

A further and more specific object of my invention is to overcome this difficulty and to prevent improper orientation of the severed elements as they move toward the tape. For this purpose, I change the configuration of the punch, and consequently, the outline of the waste metal cut away between elements, in such a manner as to cut away or notch the corners of the head of the element to a dimension small enough to fit between the tips of the jaws of the next element. The feed of the wire toward the tape is made such as to keep the severed elements in nested relation, and this prevents improper orientation, for the elements are supported at one end by the guides and at the other end by the jaws of the next element.

To the accomplishment of the foregoing and such other objects as may hereinafter appear, my invention consists in the method steps and apparatus elements and their relation one to the other, as hereinafter are more particularly described in the specification and sought to be defined in the claims. The specification is accompanied by drawings, in which:

Fig. 1 is a plan view of a wire partially deformed into a series of embryo fastener elements;

Fig. 2 is a side elevation of the same;

Fig. 3 is explanatory of a step in the severing and attachment of the elements to a tape;

Fig. 4 is a similar view showing a later step in the process;

Fig. 5 is a view drawn to enlarged scale to illustrate the manner in which the severed elements are guided to the tape;

Fig. 6 is explanatory of the relation between the wire, the scrap punched therefrom, and the element severed by the punching operation;

Fig. 7 is a side elevation of the complete attaching apparatus;

Fig. 8 shows the head of the apparatus of Fig. 7;

Fig. 9 is a plan view of a part of the apparatus drawn to enlarged scale;

Fig. 10 is a section taken in elevation in the plane of the line 10—10 of Fig. 9; and Fig. 11 is a fragmentary section explanatory of a detail.

Referring to the drawings, and more particularly to Figs. 1 and 2, a wire, in this case a round wire 12, is pressed, as by means of the rolling machine disclosed in the aforesaid application Serial Number 215,180, to flatten and deform the same into an integrally connected series of embryo fastener elements 14. Each element comprises a head 16 and spread embryo jaws 18. The elements are disposed end to end, and all face in the same direction, the head 16 of one element being connected to the jaws of the next element by a web of connecting material 20. The head 16 is provided with appropriate interlocking means, and in the present case, the interlocking means is conventional in comprising a projection on one side of the head and a mating recess on the opposite side of the head. The elements are preferably rolled head first, and the formed wire may be reeled on a suitable reel such as that indicated at 22 in Fig. 7. When the wire is unreeled, the elements are disposed jaw first, as they should be for convenient mounting on the tape.

The manner in which the elements are severed and attached to the tape may be described with reference to Figs. 3, 4 and 6. Referring first to Fig. 4, it will be evident that a punch such as the punch 24 may be used to cut away the web of scrap material between the elements in order to sever an element 26 from the wire 28. The configuration of the punch is also so selected as to properly finish the shaping of the elements in order to form the lugs or tangs 30 at the ends of the jaws and in order to cut away or notch the head 16 at the corners 32.

This will also be clear from inspection of Fig. 6, in which it will be seen that the piece of scrap 34 is not limited to the comparatively thin web of connecting material 20, but also includes a flange 36 of thick material cut from the inside of the embryo jaws, thus giving them the finished shape indicated at 38. The piece of scrap metal also includes projections 40 which are cut away from the corners 32 of the head.

Reverting to Fig. 4, it will be seen that the punch 24 is displaced an appreciable distance from the tape 42. In the specific case here illustrated, this displacement is equivalent to the interposition of a single loose element between the punch and the endmost element which is being attached to the tape, but it will be understood that the principles of the present invention may be used to interpose additional severed elements between the punch and the tape, if desired.

Referring now to Fig. 3, the wire 28 is fed toward the tape 42 until the jaws 38 of the endmost element are astride the beaded edge of the tape. At this time the punch 24 is elevated and therefore is not visible except for the heels 44 at each side of the wire 28. The clamping plates 46 are moved apart to a position which clears the jaws 38, this clearance being exaggerated in Fig. 3 for the sake of clarity.

As the operation of the machine proceeds, clamping plates 46 move together, and the punch 24 descends, the parts then being in the relation shown in Fig. 4. In that figure, it will be seen that the movement of clamping plates 46 closes the jaws 38 tightly against the tape, the outer walls of the jaws then assuming a parallel configuration. At the same time, the punch 24 descends, cutting away the scrap or waste metal between two of the elements and finishing the shaping of the elements.

It has already been mentioned that the punch cuts away the corners of the head of the element, as at the points 32. In Figs. 3 and 4 it will be observed that this reduces the dimension of the head of the element sufficiently to fit between the ends of the jaws. The reason for this may be explained with reference to Fig. 5 of the drawings, in which the endmost element 50 is shown astride the beaded edge 52 of the tape, while the outer corners 54 of the jaws are disposed between the clamping plates 46. Clamping plates 46 have a thickness or vertical dimension equal to the thickness of the jaws and slide beneath overhanging parts 56 of short guides or rails 58. The guides 58 have vertical surfaces 60 for confining the outermost corners of the jaws of the elements. The guides overhang to form a ledge or flange 62 which supports the elements against vertical movement. It will be understood that a flat die surface is provided at the bottom to prevent downward movement of the elements. The space between the edges 64 of the guides is made slightly greater than the width of the elements when the jaws are closed, and there is accordingly no interference with upward movement of the elements together with the tape after the element has been clamped on the tape. In Fig. 5 it will also be observed that the inner edges of clamping plates 46 are so positioned as to constitute continuations of the guide surfaces 60.

The guides hold the elements in sequence, but, because of the general V-shaped configuration of the elements, there would be nothing to prevent turning or improper orientation of the elements, between the guides. It is to prevent this possibility that the heads are notched at 32 so as to fit between the tangs 30 of the jaws, for with the relation shown, the elements are supported at both ends, thereby holding the same in properly centered or symmetrical position. At one end the corners 54 of the jaws bear against the guides. At the other end, the notches 32 of the head bear against the jaws of the next element, which in turn bears against the guides.

It will be understood that the length of the guides 58 depends upon the number of severed elements disposed between the punch and the tape, and that these guides terminate or are cut away at the heels of the punch.

Apart from the changes discussed above, it may be stated that the apparatus of the present invention structurally resembles that disclosed in the application Serial Number 215,180, issued as Patent No. 2,201,068 on May 14, 1940, previously referred to. The description of the apparatus may therefore be made very brief.

Referring to Fig. 7, the reel 22 of wire is mounted on a suitable stand 70 and the wire 28 is taken therefrom and fed to an attaching machine generally designated 72. A loop 74 of slack wire is preferably maintained between the comparatively heavy reel 22 and the machine 72, this being done by means of a follower arm 76 controlling a switch for a motor 78 which is belted to reel 22 and is operated intermittently as required to maintain the desired slack. This, of course, facilitates accurate, high-speed feed of the wire within the attaching machine. The elements are attached to a tape which passes about a tape feed drum 80 and is then guided through a tube 82 to a suitable receptacle or basket 84.

Considering the mechanism in greater detail, and referring now to Fig. 10, the punch is indicated at 24, it being mounted on a ram 90 vertically reciprocable in the ways of a stationary ram housing 92. The punch is normally elevated by spring 94. The punch may be depressed by means of a rocker 96 pivoted at 98 and having arms 100 extending to cam follower rollers engaging suitable cams 102. This is better shown in Fig. 8 in which it will be seen that the cam follower roller 104 carried at the end of arm 100 cooperates with cam 102. These parts may be in duplicate, as disclosed in the application Serial Number 215,180 previously referred to.

Referring now to Figs. 9 and 10, the wire 28 (Fig. 10) is fed by means of a feed dog 106. It is held against rearward movement by means of a check dog 108. The feed dog 106 is pivoted on a pin 110 carried in bearings 112 mounted on a slide 114. Slide 114 is normally drawn rearwardly by pull springs 116. It is fed forwardly by a feed arm which is not shown in the drawings, but is like that described in the aforesaid application Serial Number 215,180. The forked end 118 of the feed arm is shown in Fig. 10, it being adjustably connected to the slide 114 by means of a pin 120 and adjusting screws 122. The terminal point of the feed movement may be very accurately adjusted by means of adjustable stop screw 124.

To provide a gap or space between stringers, the feed of wire 28 is interrupted. This is done by elevating the check dog 108 out of the path of the wire so that the wire simply reciprocates idly with the feed dog. For this purpose, the check dog is carried in a rod 126 which, while normally urged clockwise by spring 128 connected to the upper end of arm 129, may be pulled counterclockwise by means of a link or wire 130 leading to a suitable solenoid which is energized by a counter, all as is described in the aforesaid application Serial Number 215,180. A counterclockwise movement of rod 126 pulls the check dog 108 upwardly out of the path of wire 128, as is clearly shown in Fig. 11 of the drawings. The solenoid is indicated at 144 (Fig. 8), it elevating a core 146 which in turn moves an angle lever 148 in counterclockwise direction, thereby pulling link 130 and arm 129 toward the left, as viewed in Fig. 8.

The jaws of the endmost element are clamped on the tape by means of clamping plates 46 previously referred to. Referring to Figs. 9 and 10, these plates are mounted in the forward ends of levers 132, pivoted at 134, the opposite ends of said levers carrying cam follower rollers 136, which rollers run in cam grooves formed between the cylindrical cams 138 and 140. The cylindrical cams are mounted on the main timing shaft or cam shaft 142 of the machine, this shaft also carrying the cams 102 previously referred to.

The tape feed mechanism may be described with reference to Fig. 8. The tape 42 is fed upwardly from beneath the head of the machine, and is drawn through a closely fitting tape guide which is keyhole slotted, as is indicated at 150 in Fig. 9. This may, if desired, be formed as a part of the die which receives the punch 24. The guides for the severed elements are indicated at 58, and in this case are quite short because there are only two elements between the punch and the tape. Reverting to Fig. 8, the tape with the attached elements is drawn upwardly and passed about a tape feed drum 80. The tape is held against the preferably knurled or roughened surface of the feed drum by means of a shoe 152. The pressure of shoe 152 may be released by means of handle 154. The tape moves from drum 80 into guide tube 82 previously referred to.

Tape feed drum 80 is carried on a shaft 156 one end of which is provided with a ratchet wheel 158. A holding dog 160 and a feed dog 162 cooperate with ratchet wheel 158. Feed dog 162 is carried on an arm 164 pivoted on shaft 156 and having an oppositely extending arm 168 connected to the upper end of a connecting rod 170. The lower end of connecting rod 170 is received about an eccentric 172 mounted on the main drive shaft 142 in the machine. In this way the desired intermittent feed movement of tape 42 is provided.

It is believed that the construction and operation of my improved apparatus, as well as the many advantages of the same, will be apparent from the foregoing detailed description thereof. The elements are severed before reaching the tape, and a number of severed elements may be disposed between the punch and the tape. The severed elements are accurately guided in a suitable guide track until they reach the tape. This avoids angular attachment of the elements to the tape such as may be caused by the force of the severing punch or by a kink in the wire. The die may be made more substantial, there being appreciable room between the cutting punch and the tape. Improper orientation of the severed elements is prevented by notching the head of each element to fit between the jaws of the next element. In this way the elements are held in alignment or in symmetrical position.

This desirable result is obtained while handling and feeding the wire in most satisfactory position. Specifically, the projections at the heads are disposed on top. In this way, the projections are available for use by the feed dog in feeding the wire. Moreover, the wire may be fed along a smooth, flat die surface without requiring vibration of the wire up and down such as would be needed if the projections were disposed on bottom. Furthermore, the tape is fed upwardly, which is a most satisfactory arrangement because the element being attached to the tape may be supported against downward movement by the die surface. If the tape were fed downwardly, in order to make it possible to guide the elements by means of the projections, then special reciprocating means would have to be provided to support the element against tilting or falling downwardly while it is being attached to the tape. With the present arrangement, the space between the guides may be made great enough to permit simple direct upward movement of the element with the tape after the jaws have been closed.

Greater freedom is provided in connection with timing the machine, for the severing operation is relatively removed from and independent of the attaching operation. Because of this greater liberality or tolerance in the way of timing, the motions may be made easier and smoother and higher operating speeds are made possible.

It will be apparent that while I have shown and described my invention in a preferred form, many changes and modifications may be made in the structure disclosed, without departing from the spirit of the invention defined in the following claims.

I claim:

1. In the manufacture of slide fasteners, the method of preventing improper orientation of severed slide fastener elements while feeding the same end to end between guides, said elements having heads which are wider than the space between the spread jaws, which includes so notching the end of the head of the elements that the end portion thereof is a doubly reversed curve with a resulting projecting center portion and two shoulders, the center portion being dimensioned to be received between the ends of the jaws of the next element, with said ends abutting the shoulders, guiding the severed elements by means of the jaws, and maintaining the severed elements in nested relation with the notched end of the head of one element disposed between the jaws of the next in order to prevent improper orientation of the elements.

2. In the manufacture of slide fasteners, the method of preventing improper orientation of severed slide fastener elements while feeding and clamping the same to a tape, said elements having heads which are wider than the space between the spread jaws, which includes so notching the head of the elements that the end portion thereof is a doubly reversed curve with a resulting projecting center portion and two shoulders, the center portion being dimensioned to be received between the ends of the jaws of the next element, with said ends abutting the shoulders, guiding the elements to the tape by means of the jaws, keeping the elements in nested relation with the notched end of the head of one element disposed between the jaws of the next in order to prevent improper orientation of the elements, and clamping the jaws of the endmost element on the tape.

3. In the manufacture of slide fasteners, the method which includes forming a wire of spaced embryo fastener elements, said elements having heads which are wider than the space between the spread jaws, intermittently feeding the wire with the elements jaw first toward a tape, punching away waste material between the elements of such configuration as to define the head of one element and the jaws of the next element, with the head being so notched that the end portion thereof is a doubly reversed curve with a resulting projecting center portion and two shoulders, the center portion being dimensioned to be received between the ends of the jaws, with said ends abutting the shoulders, using the feed of the wire to feed a severed element to the tape, and clamping the jaws of the element on the tape, the feed of the wire toward the tape being such as to keep the notched end of the head of the severed element between the following jaws in order to prevent improper orientation of the element.

4. In the manufacture of slide fasteners, the method which includes pressing a wire to form spaced embryo fastener elements therealong, said elements having heads which are wider than the space between the spread jaws, intermittently moving a tape, intermittently feeding the wire with the elements jaw first toward the tape, punching away waste material between the elements of such configuration as to define the head of one element and the jaws of the next element with the head being so cut away or notched at the corners that the end portion is a doubly reversed curve with a resulting projecting center portion and two shoulders, the center portion being dimensioned to fit between the ends of the jaws of the next element, with said ends abutting the shoulders, guiding the severed elements in end to end relation to the tape, and clamping the jaws of the endmost element on the tape, the feed of the wire toward the tape being such as to keep the severed elements in nested relation with the notched head of one element disposed between the jaws of the next in order to prevent improper orientation of the elements.

5. Apparatus for the manufacture of slide fastener elements, said apparatus comprising means to intermittently feed a wire made up of integrally related embryo fastener element, said elements having heads which are wider than the space between the spread jaws, and punch and die mechanism for cutting away a single piece of scrap or waste material between the head of one element and the jaws of the next element, said punch being of such configuration as to define the head of one element and the jaws of the next element and to notch the head with a doubly reversed contour defining a projecting center portion and two shoulders, the center portion being dimensioned to be received between the ends of the jaws of the next element, with the said ends abutting the shoulders, guides adjacent said punch for guiding the severed elements in end to end relation, the stroke of the wire feed means being such as to keep the severed elements in nested relation with the notched head of one partially received between the jaws of the next in order to prevent improper orientation of the elements.

6. Apparatus for the manufacture of slide fastener elements, said apparatus comprising means to intermittently feed a strip of stock, and punch and die mechanism for cutting away scrap or waste material to form fastener elements having a head and jaws and for so cutting away or notching the corners of the head as to produce a doubly reversed curve defining a projecting center portion and two shoulders, the center part thereof being dimensioned to be received between the ends of the jaws of the next element, with said jaws abutting the shoulders, while the remainder of the head is wider than the space between the ends of the jaws, guides adjacent said punch for guiding the severed elements in end to end relation, the stroke of the wire feed means being such as to keep the severed elements in nested relation with the notched head of one received between the jaws of the next in order to prevent improper orientation of the elements.

7. Apparatus for the manufacture of slide fastener stringers, said apparatus comprising means to intermittently feed a tape, means to intermittently feed a strip of stock toward the tape, punch and die mechanism spaced from said tape for severing the stock into fastener elements, said elements having heads which are wider than the space between the spread jaws, said die mechanism being of such configuration as to cut away or notch the corners of the head to produce a doubly reversed curve defining a projecting center portion and two shoulders, said center portion being dimensioned to fit between the ends of the jaws, with said jaw ends abutting the shoulders, guide means between said punch and said tape for guiding the severed elements to the tape, said guide means encompassing the ends of the spread jaws but having a space therebetween large enough to pass the element when the jaws are closed, the stroke of said strip feed means being such as to keep the severed elements in nested relation with the notched head of one between the jaws of the next in order to prevent improper orientation of the elements in the guide means, and clamping means for clamping the jaws of the endmost element on the tape.

8. Apparatus for the manufacture of slide fastener stringers, said apparatus comprising a tape guide, means to intermittently feed a tape through said tape guide, means to intermittently feed toward the tape a wire consisting of a series of integrally connected embryo fastener elements arranged end to end with the embryo jaws pointed toward the tape, punch and die mechanism spaced from said tape for severing the wire into individual elements, said elements having heads which are wider than the space between the spread jaws, said mechanism operating to cut scrap from the wire of such configuration as to define the head of the preceding element and the jaws of a succeeding element with the end part of the head notched to be received between the ends of the jaws, the end of the head being given a doubly reversed curvature defining a projecting center portion and two shoulders, the center portion being dimensioned to be received between the jaws with said jaws abutting the shoulders, guide means between said punch and said tape for guiding the severed elements to the tape, the stroke of said wire feed means being such as to keep the severed elements in nested relation with the notched head of one between th jaws of the next in order to prevent improper orientation of the elements in the guide means, and clamping means for clamping the jaws of the endmost element on the tape.

9. Apparatus for the manufacture of slide fastener stringers, said apparatus comprising means to intermittently feed a tape upwardly, means including a feed dog to intermittently feed toward the tape a wire consisting of a series of integrally connected embryo fastener elements arranged end to end with the embryo jaws pointed toward the tape and with the projections of the elements disposed upwardly, said elements having heads which are wider than the space be-between the spread jaws, said feed dog being disposed above the wire and operating on said projections, punch and die mechanism spaced from said tape for severing the wire into individual elements, said mechanism operating to cut scrap or waste from the wire of such configuration as to define the head of a preceding element and the jaws of a succeeding element with the outermost part of the head notched to be received between the ends of the jaws, the end of the head being given a doubly reversed curvature defining a projecting center portion and two shoulders, the center portion being dimensioned to be received between the jaws with said jaws abutting the shoulders, guide means between said punch and said tape for guiding the severed elements to the tape, said guide means receiving the ends of the spread jaws of the elements but being spaced apart enough to pass the element for upward movement with the tape when the jaws are closed, the stroke of said wire feed means being such as to keep the severed elements in nested relation with the notched end of the head of one between the jaws of the next in order to prevent improper orientation of the elements in the guide means, and clamping means for clamping the jaws of the endmost element on the tape.

10. Apparatus for the manufacture of slide fastener stringers, said apparatus comprising means to intermittently feed a tape, means to intermittently feed toward the tape a wire consisting of a series of integrally connected embryo fastener elements arranged end to end with the embryo jaws pointed toward the tape, said elements having heads which are wider than the space between the spread jaws, punch and die mechanism for severing the wire into individual elements, said mechanism operating to cut a single piece of scrap or waste from the wire of such configuration as to define the head of the preceding element and the jaws of a succeeding element with the outermost corners of the head cut away or notched and thereby dimensioned to be received between the ends of the jaws, the end of the head being given a doubly reversed curvature defining a projecting center portion and two shoulders, the center portion being dimensioned to be received between the jaws with said jaws abutting the shoulders, guide means between said punch and said tape for guiding a severed element to the tape, the stroke of said wire feed means being such as to feed the severed element to the tape and to keep the notched head of the element between the following jaws in order to prevent improper orientation of the elements in the guide means, clamping means for clamping the jaws of the element on the tape, and a timing shaft for operating said tape feed means, said wire feed means, said punch, and said clamping means.

FREDERICK ULRICH.